(12) United States Patent
Won et al.

(10) Patent No.: US 11,987,099 B2
(45) Date of Patent: May 21, 2024

(54) CONTROL METHOD OF AIR CONDITIONING SYSTEM FOR COMPRESSOR PROTECTION

(71) Applicants: HYUNDAI MOTOR COMPANY, Seoul (KR); KIA CORPORATION, Seoul (KR)

(72) Inventors: Seung Hyun Won, Gunpo-si (KR); Man Hee Park, Suwon-si (KR); Chul Min Kim, Seoul (KR); Dong Seok Oh, Hwaseong-si (KR); Hyo Bin Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 512 days.

(21) Appl. No.: 17/333,465

(22) Filed: May 28, 2021

(65) Prior Publication Data

US 2022/0144045 A1 May 12, 2022

(30) Foreign Application Priority Data

Nov. 6, 2020 (KR) .......................... 10-2020-0147251

(51) Int. Cl.
*B60H 1/32* (2006.01)
*B60H 1/00* (2006.01)

(52) U.S. Cl.
CPC ....... *B60H 1/3214* (2013.01); *B60H 1/00978* (2013.01); *B60H 1/3222* (2013.01);
(Continued)

(58) Field of Classification Search
CPC .............. B60H 1/3214; B60H 1/00978; B60H 1/3222; B60H 2001/3266; B60H 2001/3275
(Continued)

(56) References Cited

U.S. PATENT DOCUMENTS 5,186,015 A * 2/1993 Roehrich ................ F25B 27/00
62/133
5,842,354 A 12/1998 Kawasumi et al.
(Continued)

FOREIGN PATENT DOCUMENTS

JP 2503502 B2 6/1996
JP 2005238951 * 9/2009
(Continued)

OTHER PUBLICATIONS

Boon Chiang Ng, Application of adaptive neural predictive control for an automotive air conditioning system, Aug. 30, 2014, Elsevier, Applied Thermal Engineering (Year: 2014).*

*Primary Examiner* — Elaine Gort
*Assistant Examiner* — Matthias S Weisfeld
(74) *Attorney, Agent, or Firm* — MCDONNELL BOEHNEN HULBERT & BERGHOFF LLP (57) ABSTRACT

A control method of an air conditioning system for compressor protection includes, when an air conditioner turn-on request is present, determining, by a controller, whether a compressor operating condition is satisfied from a refrigerant state of an air conditioner, when the compressor operating condition is determined as being satisfied, determining, by the controller, whether the vehicle is in a state of being unattended for a long period of time using information collected from a vehicle, when the vehicle is determined as being in a state of being unattended for a long period of time, performing, by the controller, pre-run control for operating the compressor in a predetermined minimum load condition; and when a pre-run operating time for which the compressor is operated in a minimum load condition reaches a predetermined pre-run holding time, interrupting, by the controller, the pre-run control with respect to the compressor.

15 Claims, 6 Drawing Sheets

(52) U.S. Cl.
CPC ............... *B60H 2001/3266* (2013.01); *B60H 2001/3275* (2013.01)

(58) Field of Classification Search
USPC .......................................................... 701/36
See application file for complete search history.

(56) References Cited

U.S. PATENT DOCUMENTS

| | | | | |
|---|---|---|---|---|
| 8,181,475 | B2* | 5/2012 | Kanemaru | B60H 1/00828 |
| | | | | 62/186 |
| 9,694,647 | B1* | 7/2017 | Gleeson | B60H 1/00428 |
| 2002/0023451 | A1* | 2/2002 | Kuroda | F25B 49/022 |
| | | | | 62/228.4 |
| 2002/0092310 | A1* | 7/2002 | Murase | B60H 1/3208 |
| | | | | 62/133 |
| 2002/0113576 | A1* | 8/2002 | Oomura | H02J 1/14 |
| | | | | 320/134 |
| 2020/0001698 | A1 | 1/2020 | Jang et al. | |
| 2020/0102874 | A1* | 4/2020 | Kurtz | F02D 41/1441 |
| 2020/0298724 | A1* | 9/2020 | Rhodes | G01R 31/3835 |
| 2023/0356567 | A1* | 11/2023 | Kim | B60H 1/00735 |

FOREIGN PATENT DOCUMENTS

| | | | |
|---|---|---|---|
| JP | 4930459 B2 | | 5/2012 |
| JP | 2013-074706 A | | 4/2013 |
| JP | 2019099045 | * | 6/2019 |
| KR | 1999-0020429 A | | 3/1999 |
| KR | 2001-0008781 A | | 2/2001 |
| KR | 10-0298767 B1 | | 10/2001 |
| KR | 100387669 | * | 9/2003 |
| KR | 20150111025 | * | 10/2015 |
| WO | WO2015104970 | * | 7/2015 |

* cited by examiner

CONTROL METHOD OF AIR CONDITIONING SYSTEM FOR COMPRESSOR PROTECTION

CROSS REFERENCE TO RELATED APPLICATIONS

This application claims under 35 U.S.C. § 119(a) the benefit of priority to Korean Patent Application No. 10-2020-0147251 filed on Nov. 6, 2020, the entire contents of which are incorporated herein by reference.

BACKGROUND

(a) Technical Field

The present disclosure relates to a control method of an air conditioning system, which is capable of protecting a compressor from a failure due to an oil-free state when an air conditioner is operated in a vehicle which is in a state of being unattended for a long period of time.

(b) Background Art

Generally, vehicles are equipped with air conditioning devices which heat or cool vehicle interiors. In the vehicles, the air conditioning devices always maintain temperatures of the vehicle interiors at appropriate temperatures regardless of a variation in external temperature to provide comfortable indoor environments.

Figure 1:
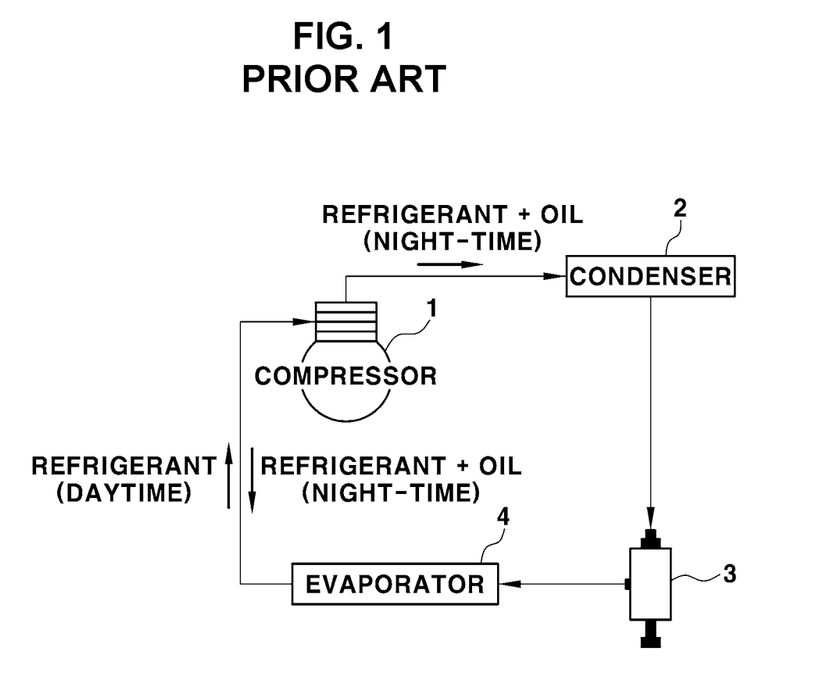
FIG. 1 is a diagram illustrating main components of a prior art air conditioning system.

An air conditioning device for a vehicle includes an air conditioning system for circulating a refrigerant. FIG. 1 is a diagram illustrating main components of a prior art air conditioning system. As the main components, the air conditioning system includes a compressor 1 for compressing a refrigerant, a condenser 2 for condensing and liquefying the refrigerant compressed by the compressor 1, an expansion valve 3 for expanding the refrigerant condensed and liquefied by the condenser 2, and an evaporator 4 for evaporating the refrigerant expanded by the expansion valve 3 and cooling air blown into the vehicle interior using latent heat of evaporation of the refrigerant.

In a summer cooling mode, the air conditioning system condenses a high-temperature and high-pressure gaseous refrigerant, which is compressed by the compressor 1, through the condenser 2, circulates the condensed refrigerant back to the compressor 1 through the expansion valve 3 and the evaporator 4, and discharges air, which is cooled due to heat exchange with the refrigerant in the evaporator 4, into the vehicle interior, thereby cooling the vehicle interior.

Meanwhile, in a condition in which a vehicle is in a state of being unattended for a long period of time before a vehicle manufacturer ships the vehicle after manufacturing and producing the vehicle, for example, when the vehicle is in a state of being unattended for a long period of time for the purpose of being exported or managed in stock, the air conditioning system is inevitably maintained in a non-operating state for a long period of time. In this case, the compressor 1, which compresses and circulates the refrigerant, is maintained in a non-operating state for a long period of time.

As described above, in the case in which the air conditioning system is maintained in a non-operating state in which the air conditioning system is not used for a long period of time, and when a user first operates an air conditioner after the vehicle is delivered to the user, a stuck and damage of components may occur in the compressor 1 due to an oil-free state.

When the air conditioning system is not operated and the vehicle is in a state of being unattended for a long period of time, a temperature difference between an interior and an exterior of the vehicle may become larger. For example, during the change of seasons, a temperature difference between daytime and night-time becomes larger, and when the temperature difference between daytime and night-time becomes larger, a temperature difference between the interior and the exterior of the vehicle may also become larger.

In the components shown in FIG. 1, the evaporator 4 is located in the vehicle interior, and the compressor 1 and the condenser 2 are located in an engine room which is the exterior of the vehicle. In this case, when the temperature difference between the interior and the exterior of the vehicle becomes larger, even when the air conditioning system is in a non-operating state, a pressure difference of the refrigerant occurs at each position in the air conditioning system so that the refrigerant moves.

That is, while the vehicle is in a state of being unattended for a long period of time, the vehicle interior is heated due to solar heat during daytime. In this case, a temperature of the evaporator 4 located in the vehicle interior is raised. Thus, a pressure of the refrigerant in the evaporator 4 is raised. In this case, a pressure difference of the refrigerant occurs between the evaporator 4 and the compressor 1 so that the refrigerant moves from the evaporator 4 to the compressor 1.

Meanwhile, a temperature of the air conditioning system is lowered during night-time, and due to an influence of geothermal heat, a lowering speed of the temperature of the compressor 1 is relatively slow. Thus, the pressure of the refrigerant in the compressor 1 is relatively higher than a pressure of the refrigerant in each of the evaporator 4 and the condenser 2. Consequently, the refrigerant and oil move from the compressor 1 to the evaporator 4 and the condenser 2. Here, the oil is for lubrication and is circulated along a refrigerant line in a state in which the refrigerant and the oil are mixed.

However, when the above-described daytime and night-time phenomena are repeated for a long period of time, a leakage of the oil in the compressor 1 is accelerated, and in spring and autumn in which the daily temperature difference is large, the oil leakage phenomenon becomes more severe. Thus, when the vehicle is in a state of being unattended for a long period of time, most of the oil in the compressor 1 is collected and remained in the evaporator 4 and the condenser 2. Consequently, an interior of the compressor 1 becomes an oil-free state in which the oil is not present or is insufficient.

When the air conditioning system is operated in such an oil-free state and the compressor 1 is operated at a high load (high revolution per minute (RPM)), damage such as stuck of internal components of the compressor 1 may occur in a state in which lubrication due to the oil is not possible. In order to prevent an oil-free state of a compressor with respect to a vehicle which is unattended for a long period of time, an operator periodically operates an air conditioner (for example, turning the air conditioner on for one minute).

However, for a plurality of vehicles which are inevitably unattended for a long period of time due to waiting for export or inventory management before the vehicles are released, since persons should manually periodically operate air conditioners, a separate manpower operation cost is inevitably incurred. In addition, in the case in which many vehicles are present, it is difficult for operators to remember or confirm whether air conditioners of the vehicles are periodically operated and checked. Moreover, it is practically impossible to prevent an oil-free state of a compressor, which occurs in a long-term neglect situation (a situation in which a customer does not use a vehicle for a long period of time) that occurs after the vehicle is delivered to the customer.

SUMMARY

The present disclosure has been made in an effort to solve the above-described problems associated with prior art.

In one aspect, the present disclosure provides a control method of an air conditioning system, which is capable of protecting, even when a compressor reaches an oil-free state in a vehicle which is in a state of being unattended for a long period of time, the compressor from a failure caused due to an oil-free state when an air conditioner is operated.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

In an exemplary embodiment, the present disclosure provides a control method of an air conditioning system for compressor protection, which includes when an air conditioner turn-on request is present, determining, by a controller, whether a compressor operating condition is satisfied from a refrigerant state of an air conditioner, when the compressor operating condition is determined as being satisfied, determining, by the controller, whether the vehicle is in a state of being unattended for a long period of time using information collected from a vehicle, when the vehicle is determined as being in a state of being unattended for a long period of time, performing, by the controller, pre-run control for operating the compressor in a predetermined minimum load condition, and when a pre-run operating time for which the compressor is operated in a minimum load condition reaches a predetermined pre-run holding time, interrupting, by the controller, the pre-run control with respect to the compressor.

In an embodiment of the present disclosure, in the determination of whether the vehicle is in a state of being unattended for a long period of time, when a previously predetermined controller reset condition is satisfied and thus a controller reset is performed, the controller may be provided to determine that the vehicle is in a state of being unattended for a long period of time.

In an embodiment of the present disclosure, the controller may be provided to determine whether the controller reset condition is satisfied using battery power information.

In an embodiment of the present disclosure, the controller reset condition may include a first condition in which a battery terminal is detached and then connected, and a second condition in which a predetermined set period elapses after a vehicle key-off and a state of charge (SOC) of a battery is less than a predetermined set value, and when at least one of the first condition and the second condition is satisfied, the controller may be provided to determine that the controller reset is performed previously.

In an embodiment of the present disclosure, in the determination of whether the vehicle is in a state of being unattended for a long period of time, when a non-operating time of the air conditioner, which is determined from previous air conditioner operation history information, exceeds a predetermined set time, the controller may be provided to determine that the vehicle is in a state of being unattended for a long period of time.

In an embodiment of the present disclosure, in a state of storing information on a previous air conditioner turn-off timing as the air conditioner operation history information, the controller may be provided to determine a time between the previous air conditioner turn-off timing and a current air conditioner turn-on timing as the non-operating time of the air conditioner.

In an embodiment of the present disclosure, in the determination of whether the vehicle is in a state of being unattended for a long period of time, when a non-operating time of the air conditioner, which is determined from previous vehicle key-off information, exceeds a predetermined set time, the controller may be provided to determine that the vehicle is in a state of being unattended for a long period of time.

In an embodiment of the present disclosure, in a state of storing information on a previous vehicle key-off timing, the controller may be provided to determine a time between a previous vehicle key-off timing and a current vehicle key-on timing as the non-operating time of the air conditioner.

In an embodiment of the present disclosure, in a state of storing information on a previous vehicle key-off timing, the controller may be provided to determine a time between a previous vehicle key-off timing and a current air conditioner key-on timing as the non-operating time of the air conditioner.

In an embodiment of the present disclosure, the minimum load condition may be a condition for controlling an electromagnetic control valve (ECV) of the compressor, which determines a discharge amount of a refrigerant of the compressor, at a minimum duty.

In an embodiment of the present disclosure, the minimum load condition may be a condition for controlling a clutch of the compressor to be engaged only when an engine revolution per minute (RPM) providing operation power to the compressor is less than or equal to a preset pre-run speed to allow the compressor to be operated due to a rotating force of an engine only below the pre-run speed.

In an embodiment of the present disclosure, the minimum load condition may include a condition for controlling an electromagnetic control valve (ECV) of the compressor, which determines a discharge amount of a refrigerant of the compressor, at a minimum duty; and a condition for controlling a clutch of the compressor to be engaged only when an engine revolution per minute (RPM) providing operation power to the compressor is less than or equal to a preset pre-run speed to allow the compressor to be operated due to a rotating force of an engine only below the pre-run speed.

In an embodiment of the present disclosure, the pre-run holding time may be determined according to a compressor operating state by the controller.

In an embodiment of the present disclosure, the compressor operating state may be a compressor RPM or the engine RPM which provides operation power to the compressor.

In an embodiment of the present disclosure, after the vehicle is determined as being in a long-term unattended state, the controller may be provided to accumulate a pre-run operating time for which the compressor is operated in the minimum load condition, and when the accumulated pre-run operating time reaches the pre-run holding time, the controller may be provided to interrupt the pre-run control.

In addition, the control method of an air conditioning system may further include after the pre-run control is interrupted, controlling, by the controller, the compressor to be operated normally according to a cooling load request of the air conditioner in a state of being turned on.

Other aspects and preferred embodiments of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Specific structures or functional descriptions presented in the embodiments of the present disclosure are merely exemplified for the purpose of describing the embodiments according to the concept of the present disclosure, and the embodiments according to the concept of the present disclosure may be implemented in various forms. In addition, the embodiments are not to be taken in a sense which limits the present disclosure to the specific embodiments, and should be construed to include modifications, equivalents, or substitutes within the spirit and technical scope of the present disclosure.

Meanwhile, the terms first, second, and/or the like in the present disclosure may be used to describe various components, but the components are not limited by these terms. These terms may be used only for the purpose of distinguishing one component from another component, and, for example, a first component may be referred to as a second element, and similarly, the second component may also be referred to as the first component without departing from the scope of the present disclosure.

When a component is referred to as being "connected" or "coupled" to another component, it may be directly connected or coupled to another component, but it should be understood that sill another component may be present between the component and another component. On the contrary, when a component is referred to as being "directly connected to," or "directly in contact with" another component, it should be understood that still another component may not be present between the component and another component. Other expressions describing the relationship between components, that is, "between" and " immediately between," or "adjacent to" and "directly adjacent to" should also be construed as described above.

Throughout the present specification, the same reference numerals indicate the same components. Terms used herein are for the purpose of describing the embodiments and are not intended to limit the present disclosure. In the present specification, the singular forms include the plural forms unless the context clearly dictates otherwise. It is noted that the terms "comprises" and/or "comprising" used herein do not exclude the presence or addition of one or more other components, steps, operations, and/or elements in addition to stated components, steps, operations, and/or elements.

Hereinafter, exemplary embodiments of the present disclosure will be described in detail with reference to the accompanying drawings.

The present disclosure relates to a control method of an air conditioning system for compressor protection and the control method is capable of protecting, even when a compressor reaches an oil-free state in a vehicle which is in a state of being unattended for a long period of time, the compressor from a failure caused due to an oil-free state when an air conditioner is operated.

Figure 2:
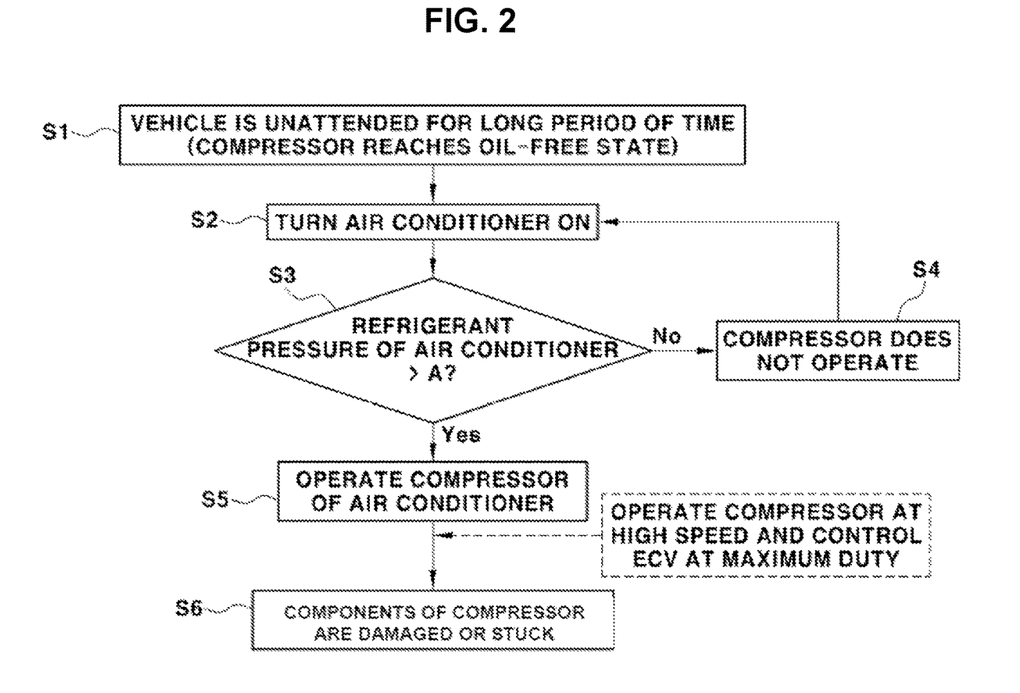
FIG. 2 is a reference diagram illustrating a process in which damage of a compressor occur in a vehicle which is in a state of being unattended for a long period of time.

Prior to describing an embodiment of the present disclosure, a process in which stuck and damage of components of a compressor occur in a vehicle which is in a state of being unattended for a long period of time will be described with reference to FIG. 2.

As described above, as shown in FIG. 2, when a vehicle is unattended for a long period of time, such as when waiting for export or inventory management, or when a driver neglects a vehicle for a long period of time without operating the vehicle, oil may move from a compressor to an evaporator and a condenser together with a refrigerant so that an oil leakage phenomenon may occur from the compressor, and thus the compressor may reach an oil-free state (S1).

When an air conditioning system is turned on in such an oil-free state of the compressor (S2), the compressor is operated when a refrigerant pressure of an air conditioner exceeds a specific pressure (A kg/cm$^2$) (S3 and S5). In this case, when an engine revolution per minute (RPM) is high (high RPM) and the compressor is operated (the compressor is operated at the high RPM) or an electromagnetic control valve (ECV) of the compressor is controlled at a large duty (e.g., controlled at a maximum duty), components of the compressor may become damaged or stuck (S6). In step S3, when the pressure of the refrigerant of the air conditioner is less than or equal to the preset pressure A, the controller 10 determines that the compressor operating condition is not satisfied, and thus the compressor 20 is not operated (S4).

For reference, the ECV is a valve which adjusts an inclination angle of a swash plate to control a discharge amount of a refrigerant in the compressor, and the inclination angle of the swash plate is varied due to the duty control of the ECV. In addition, the discharge amount of the refrigerant of the compressor is determined according to the inclination angle of the swash plate so that a load of the air conditioner may be reduced through the duty control of the ECV. As a duty of the ECV is increased, the discharge amount of the refrigerant is increased.

Figure 3:
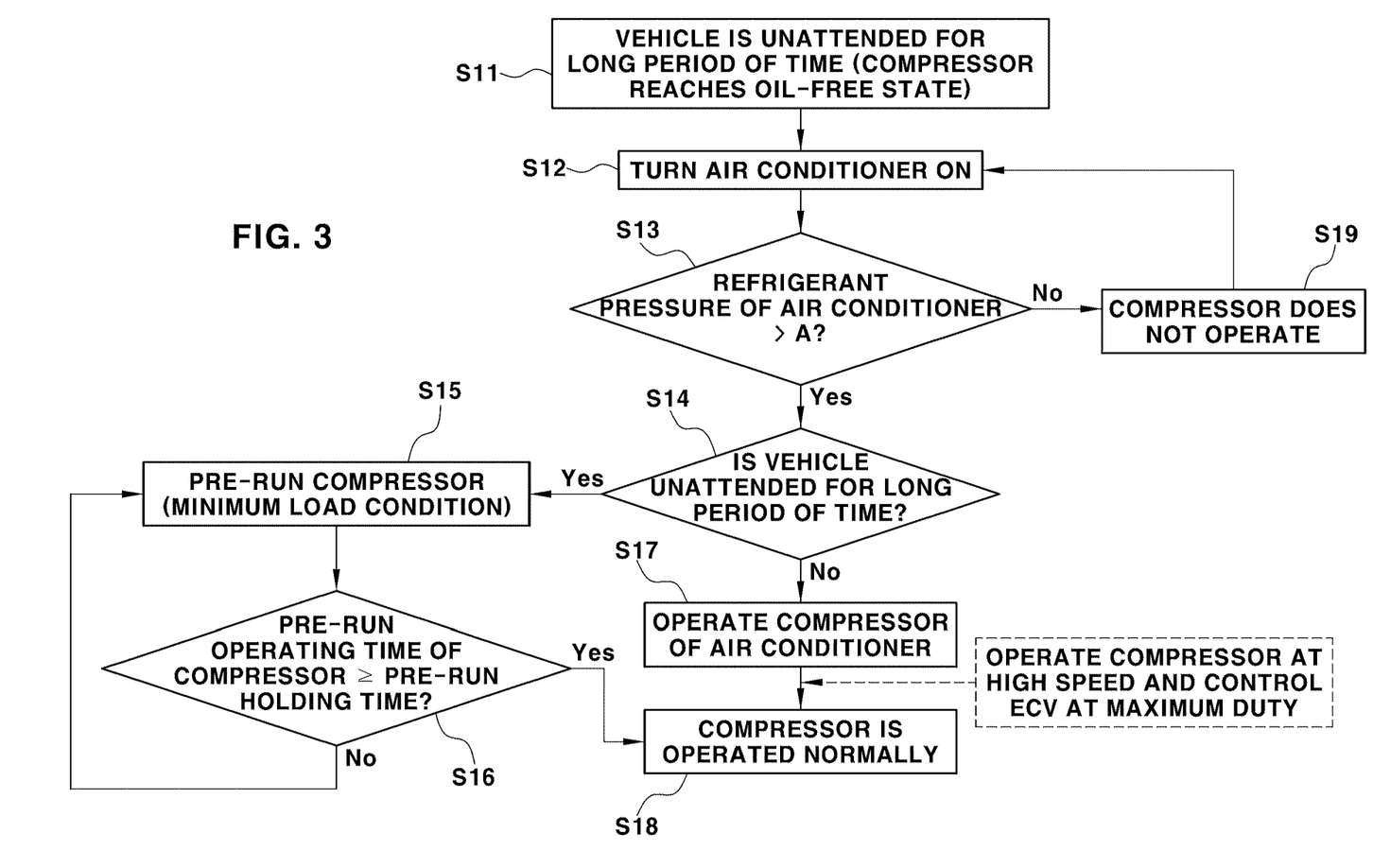
FIG. 3 is a flowchart illustrating a process of controlling an air conditioning system according to the present disclosure.
Figure 4:
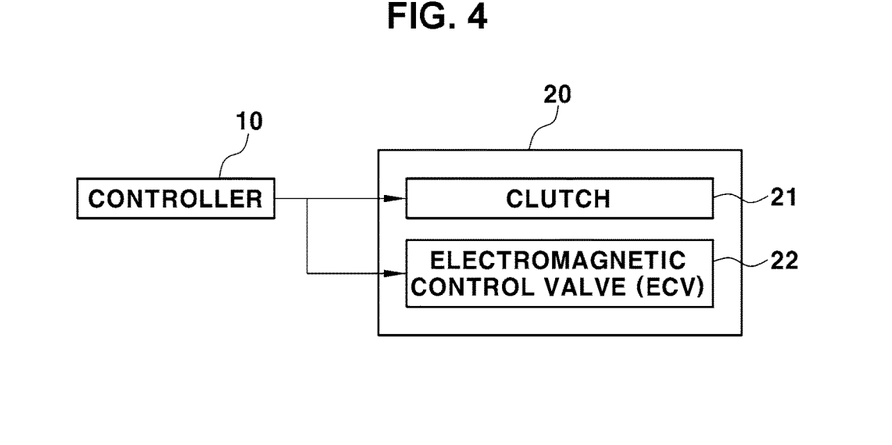
FIG. 4 is a block diagram illustrating a configuration of a device for performing a pre-run operation of a compressor in the process of controlling an air conditioning system according to the present disclosure.

Hereinafter, a control process according to the present disclosure will be described. FIG. 3 is a flowchart illustrating a process of controlling an air conditioning system so as to protect the compressor according to the present disclosure. In addition, FIG. 4 is a block diagram illustrating a configuration of a device for performing a pre-run operation of the compressor in the process of controlling an air conditioning system according to the present disclosure.

The control process of the air conditioning system according to the present disclosure is a control process of determining when the air conditioner is operated after a vehicle is unattended for any reason, whether the vehicle is in a state of being unattended for a long period of time to be automatically performed, when a long-term unattended state is determined, so as to protect the compressor.

In particular, when the vehicle is determined as being unattended for a long period of time, the control process according to the present disclosure includes a pre-run operation of the compressor and a control process thereof capable of solving an oil-free state of the compressor. That is, when the air conditioner is turned on, a controller 10 determines that the vehicle is in a state of being unattended for a long period of time to be in a state in which there may be a possibility in an oil-free state of the compressor occurs, and performs pre-run control for automatically operating a compressor 20 in a predetermined minimum load condition.

As described above, when the long-term unattended state of the vehicle is determined upon an operation of the air conditioner and then the compressor 20 is automatically pre-run, or whether components of the compressor 20 may be prevented from being damaged or stuck even when the oil-free state of the compressor 20 occurs due to the long-term unattended state of the vehicle. In the present disclosure, the pre-run control of the compressor 20 is control for operating the compressor 20 at a minimum load for a predetermined time to circulate the refrigerant and the oil, thereby allowing a lubrication action due to the oil to be performed in the compressor 20.

In the present disclosure, the long-term unattended state of the vehicle means a state in which the vehicle is parked and unattended without being operated for a long period of time, so that the oil-free state of the compressor 20 may occur. For example, the long-term unattended state of the vehicle may include all the states in which the vehicle is waited and unattended in a non-operating state for a long period of time for export after the vehicle is manufactured and produced, the vehicle is unattended in a non-operating state for inventory management for a long period of time, and the vehicle is unattended by a driver in a non-operating state for a long period of time after the vehicle is sold. In addition to the above description, a case in which the air conditioner is turned off and then the vehicle is in a state of being unattended for a long period of time without being operated may be included in the scope of the long-term unattended state of the vehicle, which is defined in the present disclosure.

Referring to FIG. 3, the vehicle is first in an unattended state, and in this case, the compressor 20 of the vehicle may be in a state in which the oil-free state is already occurred or may not reach the oil-free state (S11). Then, the controller 10 determines whether a turn-on request of the air conditioner is present. When the turn-on request of the air conditioner is determined as being present, the controller 10 confirms whether a compressor operating condition is satisfied based on a state of the refrigerant of the air conditioner (S12 and S13).

For example, when a turn-on signal of the air conditioner is received, the controller 10 determines that the turn-on request of the air conditioner is present and compares a pressure of the refrigerant of the air conditioner, which is detected by a sensor, with a preset pressure A (S13). When the pressure of the refrigerant of the air conditioner exceeds the preset pressure A, the controller 10 determines that the compressor operating condition is satisfied. In this case, when the pressure of the refrigerant of the air conditioner is less than or equal to the preset pressure A, the controller 10 determines that the compressor operating condition is not satisfied, and thus the compressor 20 is not operated (S19). Here, the controller 10 may be an air conditioning controller or may be a controller in which a control logic is set to perform the control process of the air conditioning system according to the present disclosure.

Otherwise, in step S13, when the pressure of the refrigerant of the air conditioner is determined to exceed the preset pressure A to satisfy the compressor operating condition, the controller 10 determines whether the vehicle is in a state of being unattended for a long period of time using information collected from the vehicle (S14). In one embodiment of the present disclosure, in the process of determining whether the vehicle is in a state of being unattended for a long period of time, the controller 10 determines whether a reset of the controller 10 is present before the determination process. When the reset of the controller 10 is present, the controller 10 may determine as a long-term unattended state with a probability in which the vehicle is in an oil-free state of the compressor 20. Here, the controller 10 for determining whether the reset is present may be an air conditioning controller. The air conditioning controller may be the controller 10 of an air conditioning system including a heater system of the vehicle, such as an air conditioner controller or a heater controller.

In addition, the controller 10 determines whether a preset controller reset condition is satisfied so as to determine whether a controller reset is present. In this case, the controller 10 uses battery power information to determine whether the reset condition is satisfied. In an embodiment of the present disclosure, a reset condition of the controller 10 may include a first condition in which a battery terminal is removed and then connected, and a second condition in which a predetermined set period (e.g., seven days) elapses after a vehicle key-off and a current state of charge (SOC) of a battery is less than a predetermined set value (e.g., 60%). When any one of the first condition and the second condition is satisfied, the controller 10 determines that the controller reset is previously performed to determine that the vehicle is in a long-term unattended state.

The air conditioning controller receives SOC information on the battery from a battery management system (BMS) to use the SOC information in determining whether the vehicle is in a state of being unattended for a long period of time. The BMS may be provided in the vehicle to collect battery status information and perform control for managing the battery and may provide the SOC information on the battery to other controllers through a vehicle network.

As another embodiment, in the process of determining whether the vehicle is in a state of being unattended for a long period of time, when the air conditioner is determined as being in a non-operating state for a long period of time on the basis of previous operation history information on the air conditioner, the controller 10 may determine as the long-term unattended state of the vehicle with the probability in which the vehicle is in the oil-free state of the compressor 20. Here, the operation history information on the air conditioner includes information on a time when the air conditioner is previously turned off, and the time when the air conditioner is turned off means a time when the compressor is turned off.

Figure 5:
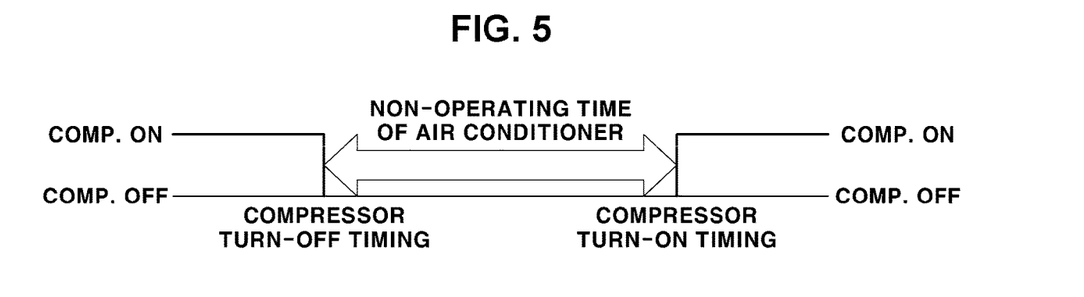
FIG. 5 is a diagram for describing an embodiment in which a time between a previous air conditioner turn-off timing and a current air conditioner turn-on timing is determined as an air conditioner non-operating time according to the present disclosure.

FIG. 5 illustrates a time between a previous air conditioner turn-off timing and a current air conditioner turn-on timing for determining whether the vehicle is in a state of being unattended for a long period of time, and the time therebetween is a non-operating time of the air conditioner. In an embodiment of FIG. 5, in order to determine the non-operating time of the air conditioner, the controller 10 is set to store air conditioner turn-off timing information when the air conditioner is turned off in a random access memory (RAM) as the operation history information on the air conditioner.

In this case, as in step S12 of FIG. 3, when the air conditioner is turned on, the controller 10 checks the time between the current air conditioner turn-on timing and the previous air conditioner turn-off timing and compares the time with a predetermined set time (e.g., thirty days). In this case, when the non-operating time of the air conditioner exceeds the predetermined set time, the controller 10 determines that the air conditioner is in a non-operating state for a long period of time and determines the vehicle as being in the long-term unattended state.

In still another embodiment, in the process of determining whether the vehicle is in a state of being unattended for a long period of time, when the air conditioner is determined as being in a non-operating state for a long period of time on the basis of previous vehicle key-off information, the controller 10 may determine as the long-term unattended state of the vehicle with the probability in which the vehicle is in the oil-free state of the compressor 20. Here, when the controller 10 performing the control process of the air conditioning system according to the present disclosure is an air conditioning controller (an air conditioner controller or a heater controller) of the vehicle, the air conditioning controller may receive key-off information provided from a vehicle controller through the vehicle network and use the received key-off information to determine whether the vehicle is in a state of being unattended for a long period of time.

Figure 6:
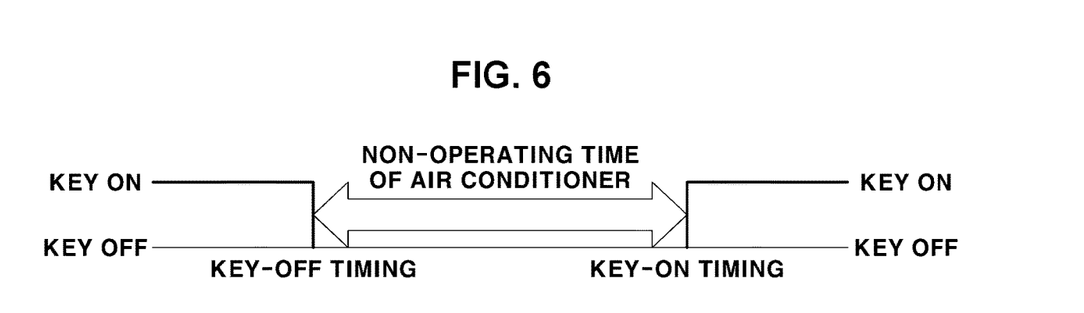
FIG. 6 is a diagram for describing an embodiment in which a time between a previous vehicle key-off timing and a current vehicle key-on timing is determined as an air conditioner non-operating time according to the present disclosure.

FIG. 6 illustrates a time between a previous vehicle key-off timing and a current vehicle key-on timing for determining whether the vehicle is in a state of being unattended for a long period of time, and the time therebetween is regarded as a non-operating time of the air conditioner. In this case, the air conditioning controller may receive the current vehicle key-on timing information along with the previous vehicle key-off timing information from the vehicle controller and use the received information to determine the non-operating time of the air conditioner. Alternatively, when the air conditioner is turned on as in step S12 of FIG. 3, the air conditioning controller may be set to determine a time between the previous vehicle key-off timing and the current air conditioner turn-on timing, which are received from the vehicle controller, as the non-operating time of the air conditioner.

To this end, when the vehicle is keyed off, the vehicle controller may be set to store information on a key-off timing in a RAM, and then, after the vehicle is keyed on, when the air conditioner is turned on as in step S12 of FIG. 3, the vehicle controller may be set to transmit the previous vehicle key-off timing information and the current vehicle key-on timing information to the air conditioning controller. Thus, the air conditioning controller determines the time between the previous vehicle key-off timing and the current vehicle key-on timing as the non-operating time of the air conditioner and compares the determined non-operating time of the air conditioner with a predetermined set time (e.g., thirty days). In this case, when the non-operating time of the air conditioner exceeds the predetermined set time, the air conditioning controller determines that the air conditioner is in a non-operating state for a long period of time and determines the vehicle as being in the long-term unattended state.

Meanwhile, as described above, after the controller 10 checks whether the vehicle is in a state of being unattended for a long period of time to determine that the vehicle is currently in the long-term unattended state, the controller 10 performs control for performing a pre-run operation on the compressor in a predetermined pre-run operation condition, that is, a minimum load condition (S15 and S16). Otherwise, when the vehicle is not in the long-term unattended state, the controller 10 normally operates the compressor 20 according to a cooling load request (S17 and S18). That is, when the air conditioner is turned on, general compressor control is performed to operate or control the compressor 20 according to conditions such as a target air conditioning temperature, an engine RPM, and the like.

In the present disclosure, when the vehicle is determined as being in the long-term unattended state upon the turning-on of the air conditioner, the pre-run operation of the compressor 20 and the control therefor operate the compressor 20 in advance in a set minimum load condition before the compressor 20 is operated normally, and objectives of the pre-run operation and the control therefor are to solve an oil-free state of the compressor 20. That is, when the vehicle is determined as being in the long-term unattended state, it is regarded that the oil-free state of the compressor 20 occurs, and thus, in order to solve the oil-free state, the compressor 20 is pre-run before a normal operation.

As described above, when the compressor 20 is pre-run in the minimum load condition before the normal operation, the refrigerant and the oil are circulated along the refrigerant line of the air conditioning system so that the oil-free state in the compressor 20 may be solved to some extent. In the present disclosure, the pre-run operation of the compressor 20 is performed for the purpose of solving the oil-free state of the compressor 20 to protect the compressor 20 regardless of a target air conditioning temperature or the engine RPM, and the pre-run operation operates the compressor 20 for a pre-run holding time which is determined according to a compressor operating state in the minimum load condition (pre-run operating condition).

Here, the minimum load condition (pre-run operating condition) means a compressor load condition in which the compressor 20 is capable of being operated without occurrence of a stuck and damage of components when being operated even in the oil-free state. In the present disclosure, as an embodiment in which the compressor 20 is operated in the minimum load condition, the controller 10 may be set to control an ECV 22 of the compressor 20 at a set minimum duty and operate the compressor to be pre-run during the pre-run holding time.

The pre-run holding time is determined according to the compressor operating state, and the compressor operating state may be a compressor RPM, and since the compressor 20 is operated by receiving a rotating force of the engine, the compressor RPM is equal to the engine RPM. That is, the pre-run holding time may be determined according to the engine RPM in the controller 10. When the pre-run holding time is determined according to the engine RPM, the controller 10 operates the compressor 20 in the minimum load condition for the determined pre-run holding time.

Figure 7:
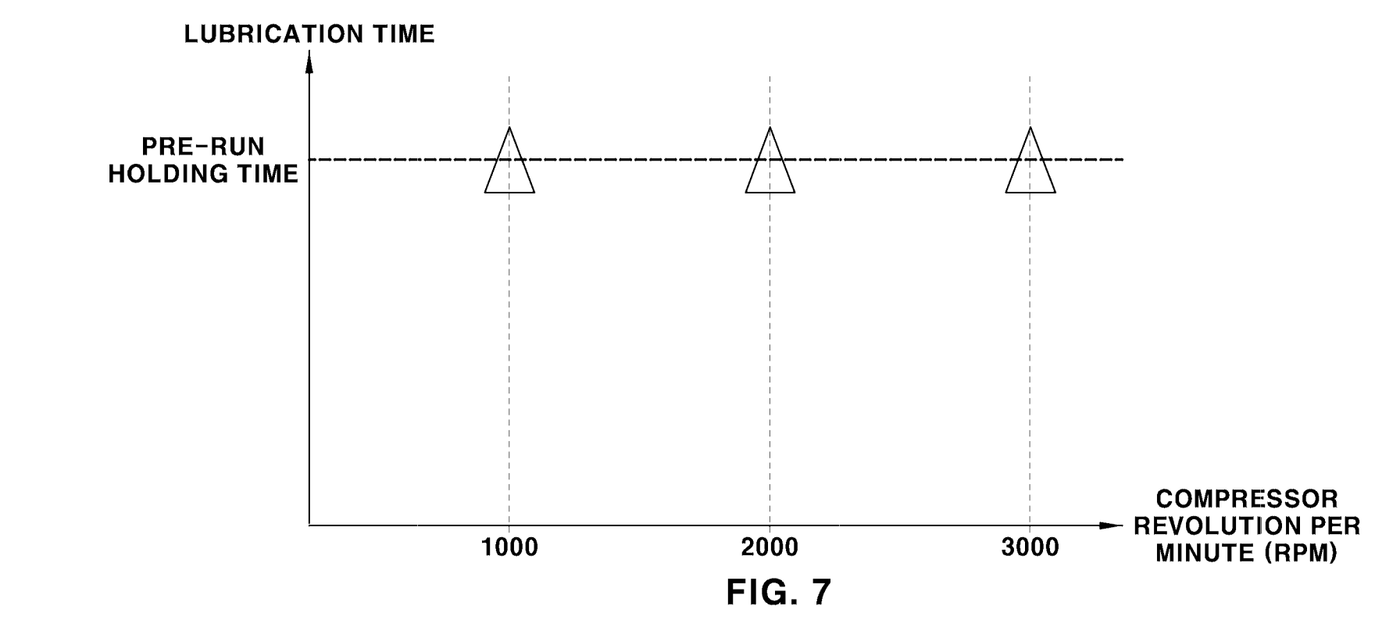
FIG. 7 is a graph illustrating an example of a pre-run holding time which is set according to an engine revolution per minute (RPM) (a compressor RPM) according to an embodiment of the present disclosure.

FIG. 7 is a graph illustrating an example of the pre-run holding time which is set according to the engine RPM (the compressor RPM) according to an embodiment of the present disclosure. The pre-run holding time may be set in the controller 10 in advance according to the engine RPM, and the pre-run holding time may be determined from a current engine RPM using such setting data. When the minimum load condition in which the compressor 20 is operated without damage in an oil-free state is set to the pre-run operating condition, an operating time for which the compressor 20 is operated in the pre-run operating condition to reach an oil state, in which the oil is circulated, from the oil-free state becomes the pre-run holding time.

The setting data may be data defining a correlation between the engine RPM (the compressor RPM) and the pre-run holding time and may be a map, a diagram, or a table. The setting data may be obtained from result data which is obtained by performing a preliminary test and an evaluation process on a vehicle of the same specification. In this case, even when whether the compressor 20 is damaged for each engine RPM in the oil-free state is checked, and then the compressor 20 is driven at a corresponding RPM, it is possible to obtain the above setting data by setting a time for which damage does not occur in the compressor 20 as the pre-run holding time.

As described above, while the pre-run operation is performed, when a driver turns off the air conditioner or the vehicle is keyed off so that the pre-run operation is interrupted, the controller 10 stores a time for which the pre-run operation is performed, and then, when the air conditioner is turned on again, the controller 10 performs the pre-run operation and accumulates and counts the pre-run operating time. Thereafter, even when the air conditioner is turned off again or the vehicle is keyed off so that an operation of the air conditioner is interrupted, the pre-run operation is continued until the pre-run operating time, which is accumulated whenever the air conditioner is turned on after the determination of whether the vehicle is in a state of being unattended for a long period of time, reaches the determined pre-run holding time (S15 and S16).

As described above, after the vehicle is determined as being in the long-term unattended state in step S14 of FIG. 3, the compressor 20 is continuously pre-run in the minimum load condition until the accumulated pre-run operating time reaches the pre-run holding time (S15 and S16). When the pre-run operation is completed for the determined pre-run holding time, the pre-run control for the compressor 20 is interrupted, and then the compressor 20 is controlled to be operated in a general operating state according to the general control process (S18).

In addition, in the present disclosure, as another embodiment in which the compressor 20 is operated in the minimum load condition, the controller 10 controls a clutch 21 of the compressor 20 to be engaged only when the engine RPM (the compressor RPM) is less than or equal to a preset pre-run speed (RPM) so that the compressor 20 may be operated due to the rotating force of the engine only when the compressor RPM is less than or equal to the pre-run speed. When the engine RPM exceeds the pre-run speed, the pre-run operation of the compressor 20 is interrupted. Then, when the engine RPM is less than or equal to the pre-run speed again, the compressor 20 is operated to be pre-run again and the pre-run operating time is accumulated.

Figure 8:
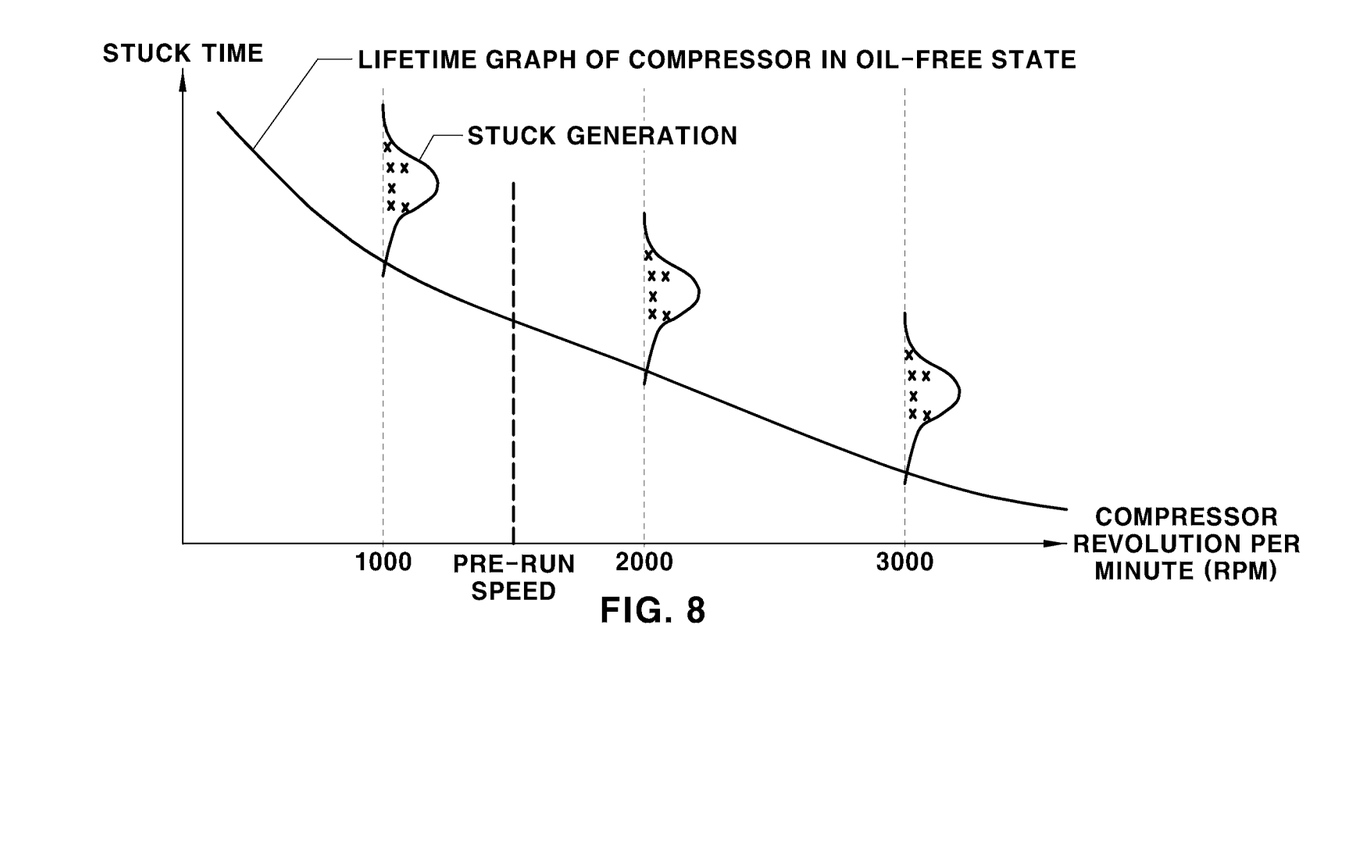
FIG. 8 is a diagram illustrating a lifetime graph of a compressor in an oil-free state.

FIG. 8 is a diagram illustrating a lifetime graph of the compressor in the oil-free state and a diagram for describing a method of determining the pre-run speed in the present disclosure. Through the preliminary test and the evaluation process, it is checked whether a component of the compressor is stuck in the oil-free state for each compressor RPM (each engine RPM), and on the basis of a result, an RPM, that is, a pre-run speed, at which the compressor 20 is capable of being operated in a condition and a time in which a stuck is not generated may be determined.

As described above, only when the engine RPM (the compressor RPM) is less than or equal to the pre-run speed, the controller 10 allows the clutch 21 to be engaged to operate the compressor 20 in the minimum load condition, accumulates a time for which the compressor 20 is operated at a speed that is less than or equal to the pre-run speed, and operates the compressor 20 to be pre-run until the accumulated time reaches the pre-run holding time. Thereafter, when the pre-run operating time of the compressor 20 reaches the pre-run holding time, the compressor 20 is operated normally according to a cooling load request in a state in which the air conditioner is turned on.

Next, in the present disclosure, as another embodiment in which the compressor 20 is operated in the minimum load condition, the controller 10 may control the ECV 22 of the compressor 20 to a set minimum duty and, simultaneously, direct the clutch 21 to be engaged only when the engine RPM is less than or equal to the pre-run speed to operate the compressor 20 in the minimum load condition. Thus, the pre-run operation is also continuously or intermittently repeated until the pre-run holding time is reached (S15 and S16), and after the accumulated pre-run operating time reaches the pre-run holding time, the compressor 20 is operated normally in a state in which the air conditioner is turned on (S18).

As described above, in the present disclosure, when the air conditioner is turned on, the controller checks whether the vehicle is in a state of being unattended for a long period of time and, when the long-term unattended state is determined, the controller controls to operate the compressor to be pre-run for a predetermined time in the minimum load condition and to operate the compressor normally so that, even when the vehicle is in a state of being unattended for a long period of time and thus the compressor is in the oil-free state, the oil-free state of the compressor may be solved through the pre-run operation, and eventually the compressor may be prevented from being damaged due to the oil-free state.

As described above, in accordance with a control method of an air conditioning system for compressor protection according to the present disclosure, even when a compressor reaches an oil-free state in a vehicle which is in a state of being unattended for a long period of time, the compressor can be protected from a failure caused due to an oil-free state when an air conditioner is operated.

In particular, it is possible to omit inspection work by manpower, such as an operation of the air conditioner, which should be periodically carried out so as to prevent the compressor from becoming the oil-free state when the vehicle is in a state of being unattended for a long period of time so that costs due to manpower operation and the like can be reduced.

In addition, even when the vehicle is sold, handed over to a driver, and unattended for a long period of time by the driver, it is possible to effectively prevent a stuck and damage of components of the compressor, which may occur due to an oil-free state when the air conditioner is operated.

Although the embodiments of the present disclosure have been described in detail, the scope of the prevent disclosure is not limited to these embodiments, and various modifications and improvements devised by those skilled in the art using the fundamental concept of the present disclosure, which is defined by the appended claims, further fall within the scope of the present disclosure.

The invention claimed is:

1. A control method of an air conditioning system for compressor protection, the control method comprising:
    determining, by a controller, whether a compressor operating condition is satisfied from a refrigerant state of an air conditioner, when an air conditioner turn-on request is present;
    determining, by the controller, whether the vehicle is in a state of being unattended for a long period of time using information collected from a vehicle, when the compressor operating condition is determined as being satisfied;
    performing, by the controller, a pre-run control for operating the compressor in a predetermined minimum load condition, when the vehicle is determined as being in a state of being unattended for a long period of time; and
    interrupting, by the controller, the pre-run control with respect to the compressor, when a pre-run operating time for which the compressor is operated in a minimum load condition reaches a predetermined pre-run holding time
    wherein the pre-run holding time is determined according to a compressor operating state by the controller.

2. The control method of claim 1, wherein, in the determination of whether the vehicle is in a state of being unattended for a long period of time, when a previously predetermined controller reset condition is satisfied, and thus a controller reset is performed, the controller determines that the vehicle is in a state of being unattended for a long period of time.

3. The control method of claim 2, wherein the controller is configured to determine whether the controller reset condition is satisfied using battery power information.

4. The control method of claim 2, wherein the controller reset condition includes:
    a first condition in which a battery terminal is detached and then connected; and
    a second condition in which a predetermined set period elapses after a vehicle key-off and a state of charge (SOC) of a battery is less than a predetermined set value;
    wherein, when at least one of the first condition and the second condition is satisfied, the controller determines that the controller reset is performed previously.

5. The control method of claim 1, wherein, in the determination of whether the vehicle is in a state of being unattended for a long period of time, when a non-operating time of the air conditioner, which is determined from previous air conditioner operation history information, exceeds a predetermined set time, the controller determines that the vehicle is in a state of being unattended for a long period of time.

6. The control method of claim 5, wherein, in a state of storing information on a previous air conditioner turn-off timing as the air conditioner operation history information, the controller determines a time between the previous air conditioner turn-off timing and a current air conditioner turn-on timing as the non-operating time of the air conditioner.

7. The control method of claim 1, wherein, in the determination of whether the vehicle is in a state of being unattended for a long period of time, when a non-operating time of the air conditioner, which is determined from previous vehicle key-off information, exceeds a predetermined set time, the controller determines that the vehicle is in the state of being unattended for a long period of time.

8. The control method of claim 7, wherein, in a state of storing information on a previous vehicle key-off timing, the controller determines a time between a previous vehicle key-off timing and a current vehicle key-on timing as the non-operating time of the air conditioner.

9. The control method of claim 7, wherein, in a state of storing information on a previous vehicle key-off timing, the controller determines a time between a previous vehicle key-off timing and a current air conditioner key-on timing as the non-operating time of the air conditioner.

10. The control method of claim 1, wherein the minimum load condition is a condition for controlling an electromagnetic control valve (ECV) of the compressor, which determines a discharge amount of a refrigerant of the compressor, at a minimum duty.

11. The control method of claim 1, wherein the minimum load condition is a condition for controlling a clutch of the compressor to be engaged only when an engine revolution per minute (RPM) providing operation power to the compressor is less than or equal to a preset pre-run speed to allow the compressor to be operated by a rotating force of an engine only below the pre-run speed.

12. The control method of claim 1, wherein the minimum load condition includes:
    a condition for controlling an electromagnetic control valve (ECV) of the compressor, which determines a discharge amount of a refrigerant of the compressor, at a minimum duty; and
    a condition for controlling a clutch of the compressor to be engaged only when an engine revolution per minute (RPM) providing operation power to the compressor is less than or equal to a preset pre-run speed to allow the compressor to be operated by a rotating force of an engine only below the pre-run speed.

13. The control method of claim 1, further comprising:
after the pre-run control is interrupted, controlling, by the controller, the compressor to be operated normally according to a cooling load request of the air conditioner in a state of being turned on.

14. The control method of claim 1, wherein the compressor operating state is a compressor RPM or the engine RPM which provides operation power to the compressor.

15. The control method of claim 1, wherein, after the vehicle is determined as being in a long-term unattended state, the controller is configured to accumulate a pre-run operating time for which the compressor is operated in the minimum load condition, and when the accumulated pre-run operating time reaches the pre-run holding time, the controller is configured to interrupt the pre-run control.

* * * * *